Oct. 27, 1953 M. E. MALONEY 2,657,273

SENDER OVERLOAD CONTROL

Filed July 12, 1951 4 Sheets-Sheet 1

INVENTOR
M. E. MALONEY

BY C. Mattice

ATTORNEY

INVENTOR
M. E. MALONEY
BY C. Mattice
ATTORNEY

SENDER OVERLOAD CONTROL

Filed July 12, 1951 4 Sheets-Sheet 3

INVENTOR
M. E. MALONEY
BY C. Mattice
ATTORNEY

INVENTOR
M. E. MALONEY
BY C. Mattice
ATTORNEY

Patented Oct. 27, 1953 2,657,273

UNITED STATES PATENT OFFICE 2,657,273

SENDER OVERLOAD CONTROL

Martin E. Maloney, Flushing, N. Y., assignor to Bell Telephone Laboratories, Incorporated, New York, N. Y., a corporation of New York Application July 12, 1951, Serial No. 236,358

4 Claims. (Cl. 179—18)

This invention relates to automatic telephone systems employing common control equipment and has for its object to facilitate the disposal of calls which cannot be completed.

In automatic telephone systems, particularly those employing cross-bar switches, two sets of common control equipment are ordinarily employed in the completion of connections, that is registers or senders at the originating office which receive the complete designation of the wanted line, and registers or senders at the office of the wanted line, to which the originating register transmits all or a part of the designation and which may complete the connection. If all of the registers or senders at a wanted office are busy when the connection to that office is set up, the register or sender at the originating office cannot complete its functions at once and must wait for an idle register or sender at the wanted office to become available. If the wait is too long, the timing circuit of the originating register or sender finally causes a busy or overflow signal to be transmitted to the calling subscriber.

In the case of local telephone connections, an arrangement has been provided for rerouting calls for a particular office to an overflow signal when all incoming registers at such office are busy, but this arrangement employs an individual connection to each of a plurality of originating markers, and these individual connections are set up under manual control.

In the case of toll calls, any delay in the completion of a connection is undesirable, and, in view of the distances involved, the individual connections are uneconomical.

In accordance with the present invention, means is provided for rerouting calls to overflow, or reorder when all incoming senders are busy, employing a signal transmitted over the interoffice trunk.

More specifically, when all incoming senders of an office are busy, a multifrequency code signal is prepared for each trunk having access to such senders. When a connection is extended to one of these trunks, the signal is transmitted over the trunk to the originating sender, which responds to the signal to release the trunk and cause a new connection to be set up, over which a recorder or overflow signal will be returned to the calling subscriber or operator.

These and other features of the invention will be more apparent from a consideration of the following description when read in connection with the accompanying drawings in which.

Figures 1, 5:
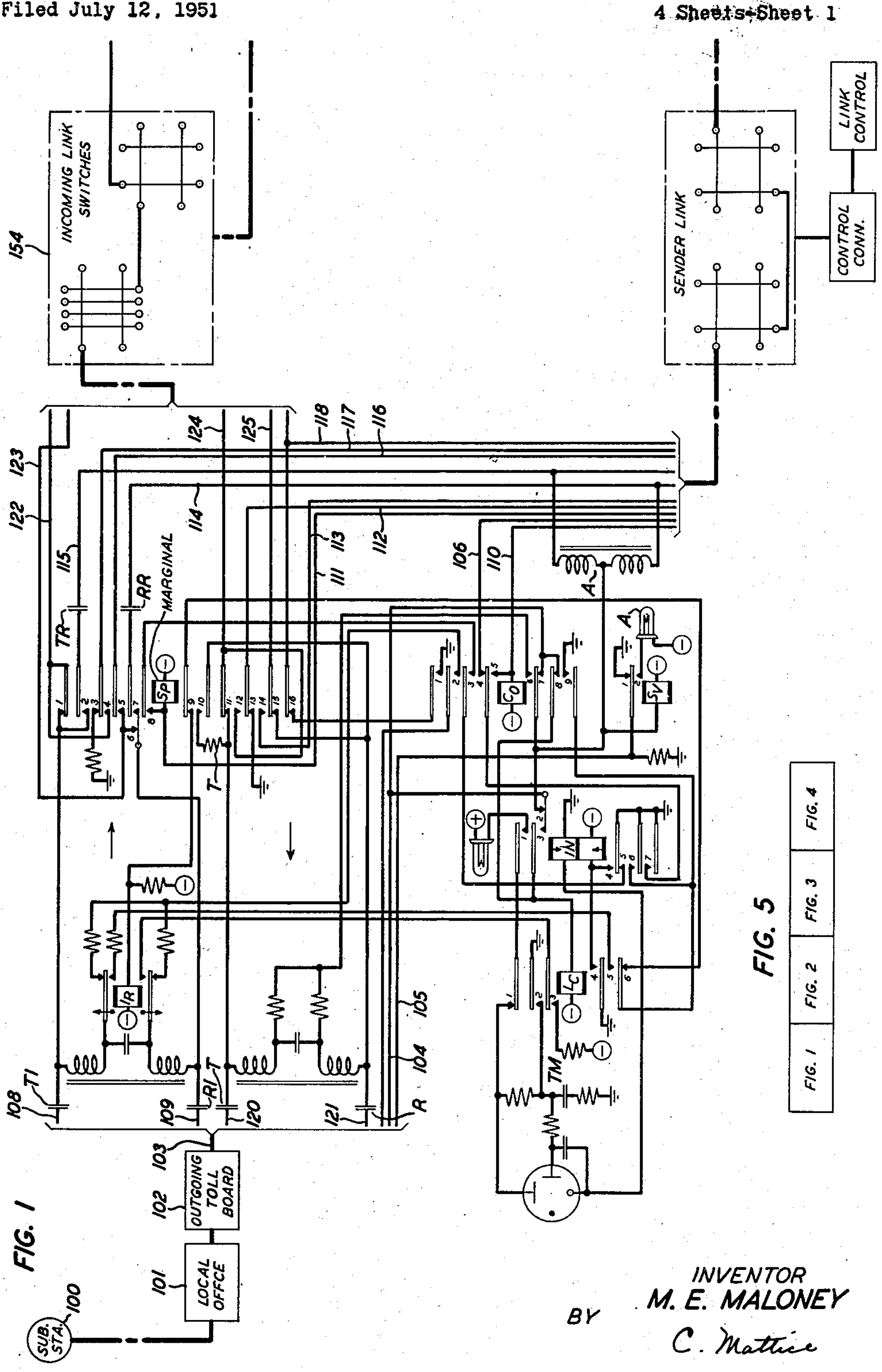
Fig. 1 shows an incoming trunk circuit, incoming trunk line and sender link.
Fig. 5 shows the manner in which Figs. 1 to 4 should be arranged.

Since the arrangement of the present invention finds its chief value in toll systems, it has been shown as applied to the toll system disclosed in Patent No. 2,564,441 to B. McKim and W. B. Strickler, granted August 14, 1951, and reference is made to that patent for a detailed disclosure of certain circuits shown schematically herein.

Assume that the subscriber at substation 100, which is connected with local office 101, wishes to talk to the subscriber at substation 400 which is connected with local office 401 reached from office 101 through two toll offices. Substation 100 will be connected in the usual manner with the outgoing toll board 102, where the operator seizes a trunk 103 outgoing to the first toll office where the trunk appears in the trunk circuit of Fig. 1.

Seizure of the trunk circuit of Fig. 1 is indicated to that circuit by the connection of ground to conductor 104, thereby completing a circuit over contact 2 of relay IN(1) or over contact 7 of relay CO(1) to battery through the winding of relay SV(1). A parallel circuit is also completed from ground on conductor 104, contact 8 of relay CO(1) to battery through the winding of relay LC(1). Relays SV(1) and LC(1) operate in these circuits.

Relay SV(1) at its contact 1 disconnects ground from conductor 105 and at its contact 2 extends conductor 105 to battery through resistance lamp A(1), as a signal to the calling office that the toll office is not ready to receive pulses.

Relay LC(1), at its contact 2 connects ground to condenser TM(1) to insure that it is completely discharged, and at contact 4 closes a circuit from ground to battery through the lower winding of relay IN(1) operating the latter relay.

Relay IN(1) locks over its contact 4 to ground independent of relay LC(1), at its contact 3 connects the winding of relay LC(1) to conductor 104, independent of relay CO(1) and connects ground over its contact 7 and contact 4 of relay CO(1) to start conductor 106 leading to the sender link.

Figure 2:
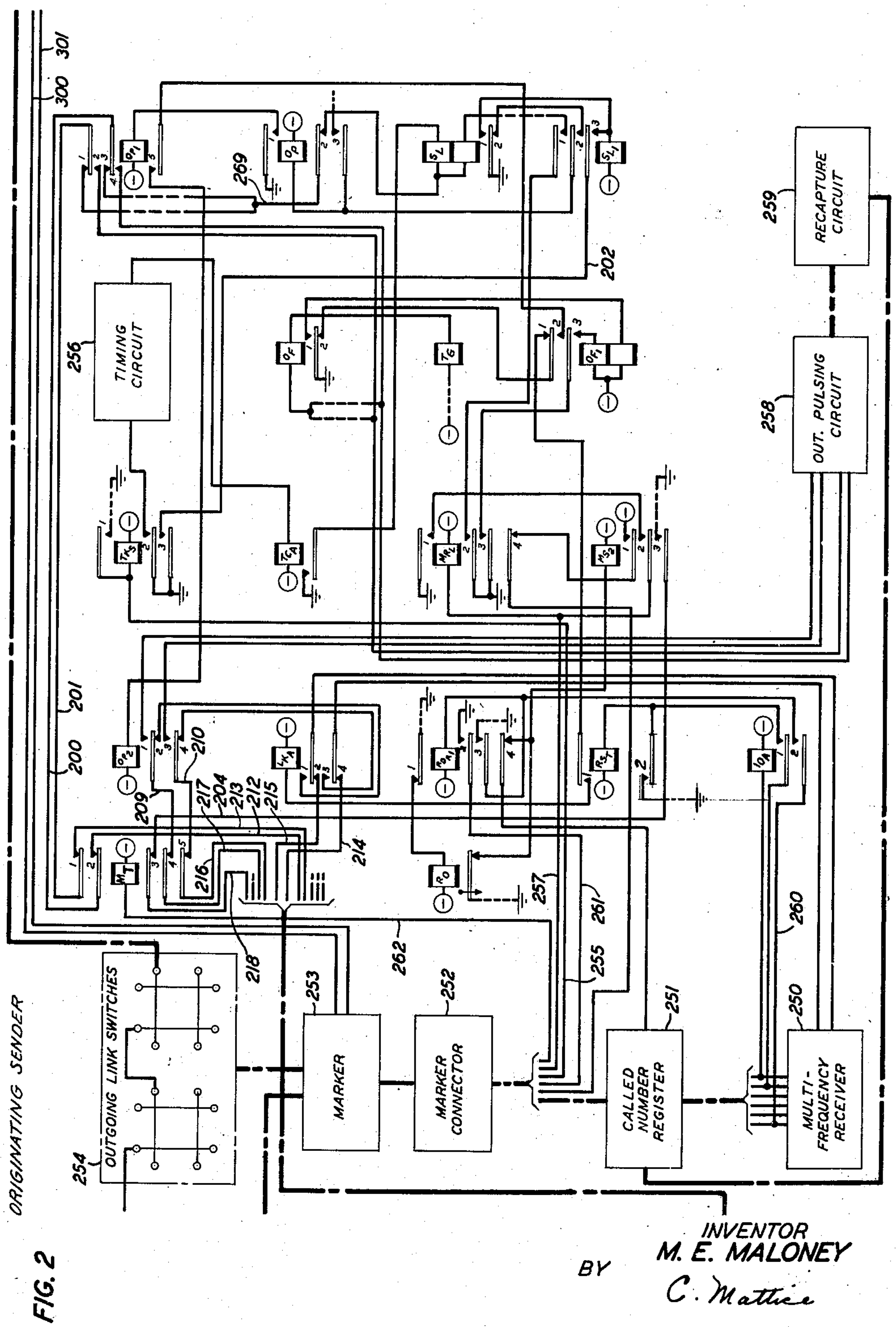
Fig. 2 shows the outgoing link switches and an originating sender.

The sender link comprises a plurality of crossbar switches, operated under the control of a link control circuit, which selects an idle sender for use and is associated with the sender link by a control connector. These circuits are shown diagrammatically since they are essentially the same as shown in Patent No. 2,293,191 granted to A. J. Busch et al., August 18, 1942. For convenience in identifying the circuits connecting the sender with the trunk circuit the conductors leaving the trunk circuit and entering the sender will be given corresponding numerical designations in the hundred series of the respective figures, namely Fig. 1 and Fig. 2.

The connection of the sender with the trunk and the preliminary operations of the sender, including the registration of the trunk class, take place as described in the McKim-Strickler patent.

When the sender has been connected with the trunk it grounds conductor 110, completing a circuit through the winding of relay CO(1) to battery. Relay CO(1) operates and closes a locking circuit for itself over its contact 5 to ground at contact 7 of relay IN(1). At its contact 4, relay CO(1) opens the start circuit for the sender link.

When the trunk class registration has been completed, low resistance ground is connected to conductor 111, operating relay SP(1), which connects the trunk conductors through to the sender.

With relay SP(1) operated, the upper pair of incoming conductors are extended to the sender, conductor 108 extending through condenser T1(1), contact 2 of relay SP(1), condenser TR(1), conductor 115, through the sender link to conductor 215, contact 2 of relay LKA(2) to the multifrequency receiving circuit 250, while conductor 109 extends through condenser R1(1), contact 7 of relay SP(1), condenser RR(1), conductor 114, through the sender link to conductor 214, contact 4 of relay LKA(2) to the multifrequency receiving circuit 250.

The lower incoming conductors 120 and 121 are connected together through condenser T(1), resistance T(1), contact 10 of relay SP(1) and condenser R(1).

Relay CO(1) at its contact 7 disconnects relay SV(1) from conductor 104, but at this time relay SV(1) is held operated in a circuit extending from battery through its winding, in parallel through the windings of retard coil A(1), over conductors 114 and 115, which extend through the sender link to conductors 214 and 215, to ground through the multifrequency pulse receiving circuit as traced above. For a complete showing of a multifrequency receiving circuit, reference may be made to United States Patent 2,382,893 to McKim-Myers, granted August 14, 1945.

Both pairs of outgoing conductors are extended to the sender, conductor 122 extending over contact 4 of relay SP(1), conductor 117, through the sender link to conductor 217, contact 4 of relay MT(2) to conductor 209, and conductor 123 extending over contact 5 of relay SP(1), conductor 116, through the sender link to conductor 216, contact 5 of relay MT(2) to conductor 210. Conductors 209 and 210 are further extended to the particular outpulsing means as will be described hereinafter.

Conductor 124 is extended over contact 12 of relay SP(1), conductor 112, through the sender link to conductor 212, contact 2 of relay MT(2), conductor 200, contact 3 of relay OP1(2), and thence over conductor 269, contact 2 of relay OP(2) to the windings of relay SL(2). Conductor 125 is extended over contact 14 of relay SP(1), conductor 113, through the sender link to conductor 213, contact 1 of relay MT(2), conductor 201, contact 1 of relay OP1(2), conductor 269 to the windings of relay SL(2). These circuits are used for supervisory purposes after the trunk circuit has been connected to an outgoing trunk.

When the originating sender is ready to receive pulses, it disconnects ground from the circuit of relay SV(1), permitting that relay to release. Relay SV(1), in releasing, disconnects battery from conductor 105 and connects ground to that conductor as a start pulsing signal to the outgoing toll board.

Figure 3:
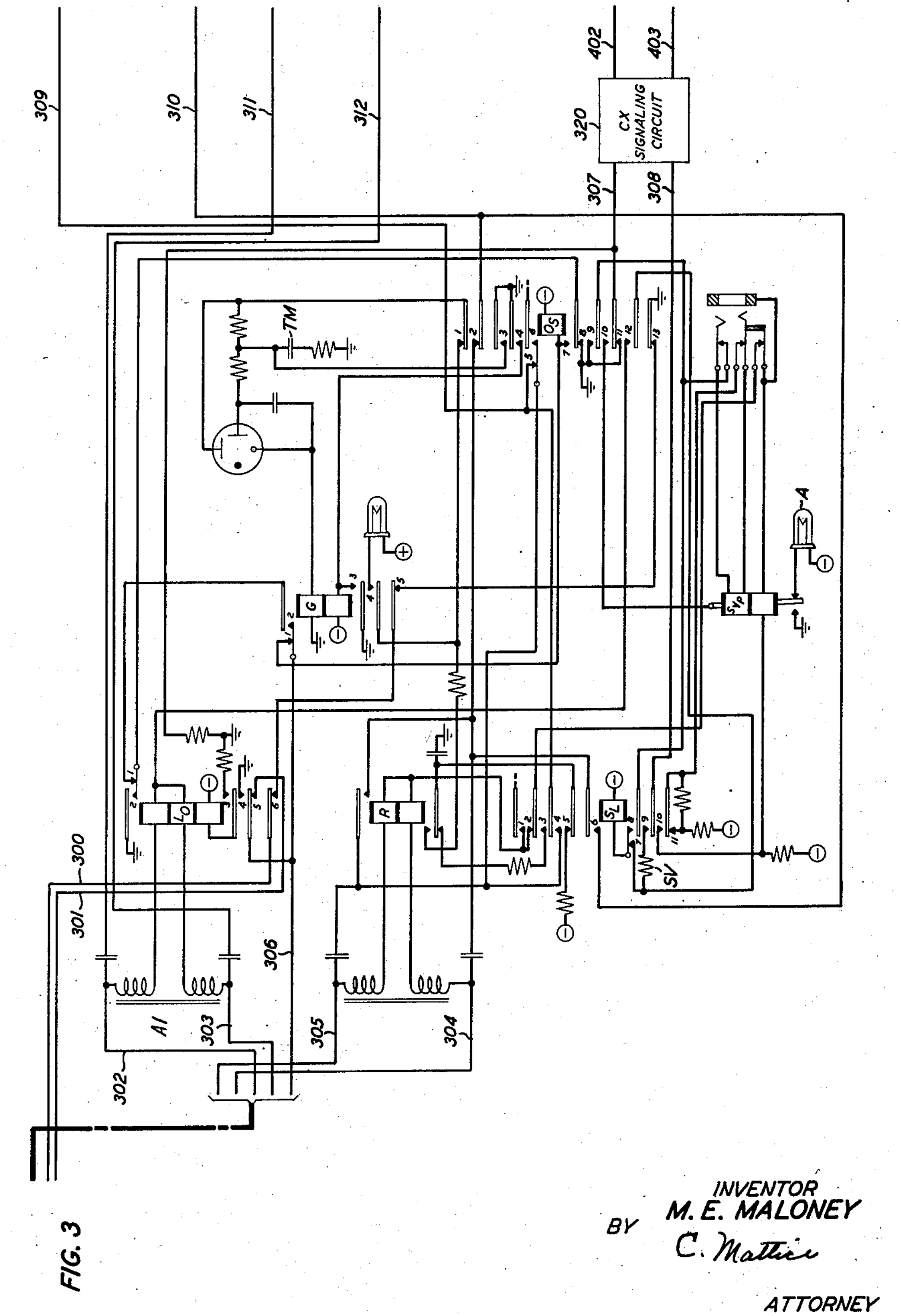
Fig. 3 shows an outgoing intertoll trunk circuit.

The operator at the outgoing toll board 102 now transmits the called number by means of multifrequency pulses which are received by the multifrequency receiver 250 which controls the setting of the called number register 251. When sufficient digits have been registered, register 251 operates marker start relay MS2(2) over contact 4 of relay ROR1(2) and relay MS2(2) connects battery over contact 4 of relay MRL(2) to the marker connector 252 to cause the connector to operate and connect the sender with an idle marker 253. The marker proceeds to select an idle outgoing intertoll trunk such as shown in Fig. 3 and operates the incoming and outgoing link switches 154 and 254 to connect the incoming trunk of Fig. 1 with the outgoing trunk of Fig. 3. It tests the continuity of the connection and then signals the sender to release the connector 252. These operations take place as described in detail in the McKim-Strickler patent.

When the marker has selected the idle outgoing trunk it grounds conductor 255, operating relay TKS(2) which locks to off-normal ground and starts the operation of the timing circuit 256. When the marker is ready to be released, it grounds conductor 257, operating marker release relay MRL(2) which locks under the control of relay MS2(2) and disconnects battery from the marker connector 252, so that the connector 252 and marker 253 are released.

When the timing circuit 256 has completed its operation it operates relay TCA(2) which connects ground to the upper, high resistance winding of relay SL(2).

Referring now to the outgoing trunk circuit of Fig. 3, this trunk circuit, when idle, connects ground over contact 13 of relay OS(3), contact 5 of relay G(3), and contact 6 of relay LO(15) to group busy conductor 300 and connects battery through the winding of relay OS(3) over contact 1 of relay G(3) and contact 5 of relay LO(3) to individual trunk busy conductor 301. The marker uses these conductors in selecting the trunk for use. Having selected the trunk, the marker grounds conductor 301, operating relay OS(3). Relay OS(3) connects ground over its contact 3 to condenser TM(3) to remove any charge that may be present. At its contact 4, relay OS(3) connects ground to battery through the lower winding of relay G(3) operating the latter relay. Relay G(3) locks to ground at its contact 3 and closes a locking circuit for relay OS(3) which may be traced from battery through the winding and over contact 7 of relay OS(3), contact 1 of relay LO(3), contact 2 of relay G(3), conductor 306, contact 5 of relay LO(3) to ground on conductor 301.

As soon as the switches have been operated, conductors 302 to 306 of the outgoing trunk circuit are extended through the outgoing link switches and incoming link switches to conductors 122 to 125 and 118, respectively, of the incoming trunk circuit. Conductor 118 thence extends through the sender link switches to conductor 218 of the sender and over contact 3 of relay MT(2), conductor 204, contact 3 of relay MS2(2) to off-normal ground. The connection of this ground to conductor 391 provides a locking circuit for relay OS(3) under the control of the sender.

Figure 4:
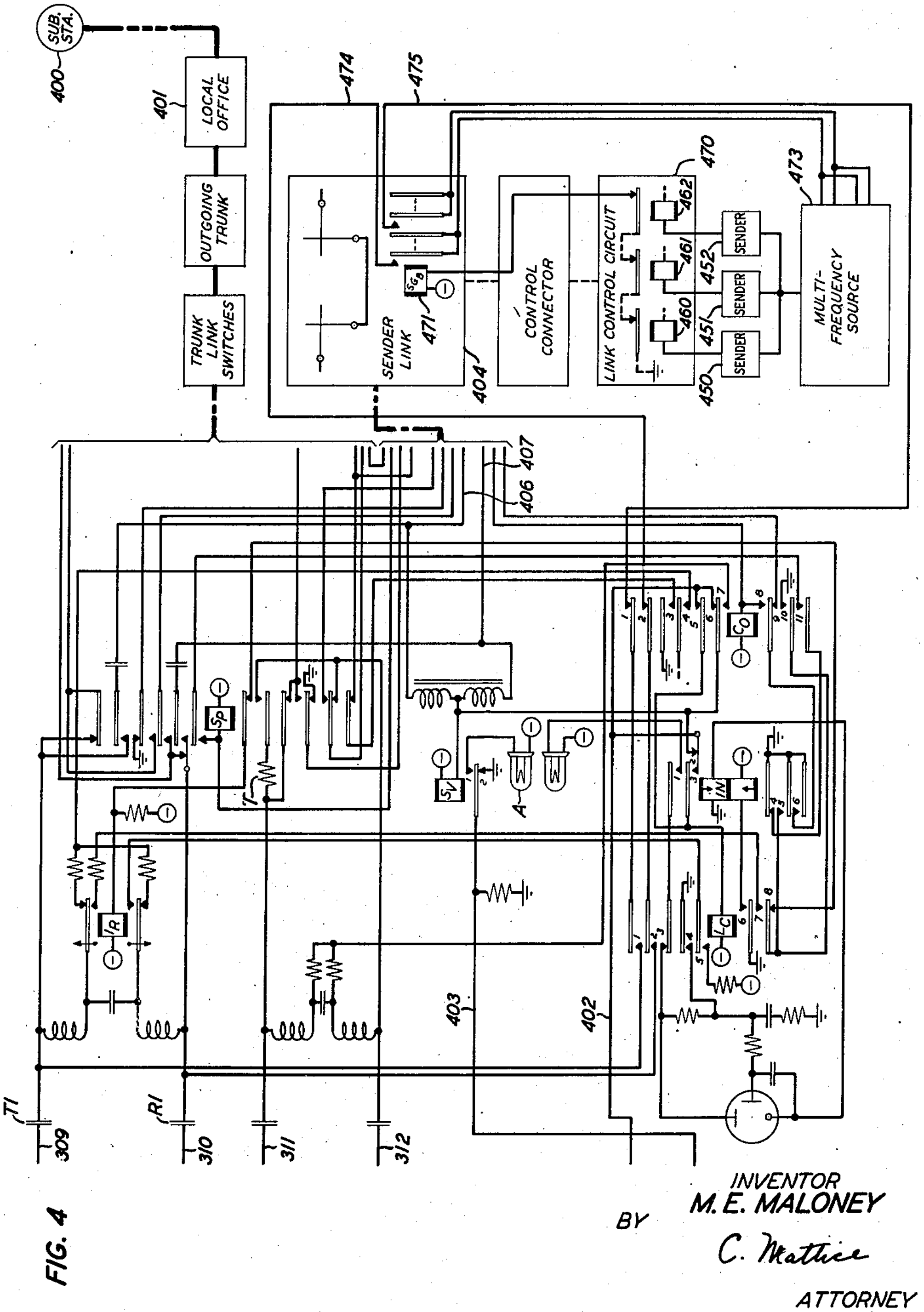
Fig. 4 shows an incoming intertoll trunk circuit at a distant office and the all senders busy equipment at that office.

The outgoing trunk circuit of Fig. 3 is connected with the incoming trunk circuit of Fig. 4 located at the distant toll office by means of the talking conductors 309 to 312. Signaling between the offices takes place over conductors 307, 308, 402 and 403 through the medium of the composite signaling circuit 320.

Relay OS(3) when operated, at its contact 11 disconnects ground from conductor 307 leading to the composite signaling circuit 320 and extends that conductor over its contact 10 and contact 2 of relay SVP(3) to battery through resistance lamp A(3). The composite signaling circuit 320, in response to this signal, connects ground to conductor 402, completing a circuit over contact 5 of relay CO(4) to battery through the winding of relay LC(4) and over contact 6 of relay CO(4) to battery through the winding of relay SV(4). Relay SV(4) at its contact 2 disconnects ground from conductor 403 leading to the composite signaling circuit 320 and, at its contact 1, connects that conductor to battery through resistance lamp A(4). The composite signaling circuit, in response to this signal, connects ground to conductor 308 as a stop-dial signal.

Relay LC(4) operates relay IN(4) and initiates the connection of an idle sender through the sender link 404 with the incoming trunk of Fig. 4 at the second intertoll office in the same manner as described for the incoming trunk of Fig. 1.

If an idle incoming sender is available and is connected with the trunk circuit of Fig. 4, it operates relay CO(4) and, later, relay SP(4) in the manner described for the trunk of Fig. 1. Relay CO(4) disconnects relay SV(4) from conductor 402, but that relay is held operated from the sender over conductors 406 and 407 until the sender is ready to receive pulses. Relay SP(4) extends incoming conductors 309 and 310 to conductors 406 and 407 to provide a path for the multifrequency pulses to the sender and connects incoming conductors 311 and 312 together through resistance T(4). When the sender is ready to receive pulses, it releases relay SV(4) and that relay disconnects battery from conductor 403 and connects ground thereto. The composite signaling circuit responds, removing ground from conductor 308 and connecting battery thereto.

With ground connected over the contact of relay TCA(2) to the high resistance upper winding of relay SL(2) parallel circuits are closed as previously traced to conductors 124 and 125 which are now extended through the trunk link switches to conductors 302 and 303, through the windings of retard coil A1(3), and through the upper and middle windings of relay LO(3) and thence in common over contact 12 of relay OS(3), contact 7 and winding of relay SL(3) to battery. Relay SL(2) operates in this circuit but the resistance of relay SL(2) is such that relay SL(3) does not operate. When relay SL(2) operates, a circuit is closed from battery through the winding of relay SL1(2), contact 1 of relay SL(2), to ground. Relay SL1(2) operates and locks over its contact 2, conductor 202 to ground at contact 3 of relay TKS(2). With relay SL1(2) operated, the low resistance right-hand winding of relay SL(2) is connected over contact 1 of relay SL1(2) to ground at contact 1 of relay MRL(2).

The completion of this circuit reduces the resistance in the circuit of relay SL(3) sufficiently to permit that relay to operate. Relay SL(3) locks over its contact 8 to ground at contact 9 of relay OS(3), and at its contact 9 extends the circuit of relay SL(2) through resistance SV(3) to signaling conductor 308 to which the composite signaling circuit 320 has connected ground as above described. Relay SL(2) therefore now releases, completing a circuit from ground, contact 2 of relay SL(2), contact 2 of relay SL1(2) to battery through the winding of relay OP(2).

Relay OP(2) operates and locks disconnecting relay SL(2) from the circuit in which it previously operated. At its contact 1, relay OP(2) closes an obvious circuit for operating relay OP1(2).

At its contacts 1 and 3, relay OP1(2) further opens the circuit of relay SL(2) and at its contacts 2 and 4 extends conductors 200 and 201 over circuits not shown through the winding of relay OF(2), winding of relay TG(2) to battery.

This circuit extends from conductors 200 and 201 by way of the incoming and outgoing trunk circuits to conductor 308 as above traced. The sender, by means of this circuit looks at the trunk and determines the on-hook and off-hook conditions set up by the distant office. Ground on conductor 308 is an on-hook signal, and if present when relay OF(2) and TG(2) are connected to conductor 308, relay OF(2) operates. The removal of ground from conductor 308 as above described when the distant sender is ready to receive pulses, releases relay OF(2).

When relay OF(2) operates, it operates relay OF1(2) which locks under the control of relay MRL(2). When relay OF(2) releases it closes a circuit from ground over its contact 2, contact 2 of relay OF1(2), contact 5 of relay OP1(2) to battery through the winding of relay OP2(2). Relay OP2 extends conductors 216 and 217 to the outpulsing circuit 258, which is controlled by the recapture circuit 259 to send out the digits registered on register 251. For the further operation of the sender in connection with a completed call, reference may be made to the McKim-Strickler patent.

If, when the trunk circuit of Fig. 4 attempts to call in a sender, all of the senders are busy, each of the senders 450, 451, 452, etc., will have released its associated sender idle relays 460, 461, 462, etc. in the link control circuit 470 and a chain circuit is closed for operating sender group busy relay 471 in the sender link 404. With relay 471 operated, two frequencies from the multifrequency source 473 will be connected to conductors 474 and 475 and in multiple over other contacts of relay 471 to all incoming trunks. A plurality of relays like relay 471 would probably be required to supply the necessary number of contacts. The two frequencies used will represent a code not otherwise used, for example frequencies of 700 cycles and 1700 cycles.

When an incoming trunk such as the trunk of Fig. 4 has been seized and is waiting for a sender to be attached, relay LC(4) is operated and relay CO(4) is not operated. At this time conductor 474 is connected over contact 2 of relay CO(4), contact 2 of relay LC(4) and condenser R1(4) to conductor 310, while conductor 475 is connected over contact 1 of relay CO(4) and contact 1 of relay LC(4), through condenser T1(4) to conductor 309.

In the sender, following the complete registration of the line designation, a start signal made up of 1500-cycle and 1700-cycle current is received. The 1700-cycle current causes the operation of relay 10A(2), followed by the operation of relay RST(2), in response to the 1500-cycle current, the latter relay locking over its contact 2 to off-normal ground. With relay RST(2) operated and relay OF(2) not yet operated, before the sender at the distant office has indicated that it is ready to receive pulses, a circuit is closed from ground at contact 2 of relay OF(2), contact 1 of relay OF1(2), contact 1 of relay RST(2) to battery through the winding of relay LKA(2).

Conductors 309 and 310 are connected as previously traced to conductors 209 and 210. With relay OP2(2) not yet operated and relay LKA(2) operated, conductors 209 and 210 are extended over contacts 2 and 4 of relay OP2(2) and contacts 1 and 3 of relay LKA(2) to the multifrequency receiver 250. This connection may occur briefly during a normal call, but in the absence of the all senders busy signal is without effect. When relay OF(2) operates, followed by the operation of relay OF1(2) the circuit of relay LKA(2) is opened and that relay releases, disconnecting conductors 209 and 210 from the multifrequency receiver 250.

If, during the time that conductors 209 and 210 are connected to the multifrequency receiver, the all senders busy signal has been extended thereto as above traced, the 1700-cycle current causes the operation of relay 10A(2) as before. With relay 10A(2) operated the 700-cycle current causes the grounding of conductor 260, completing a circuit over contact 2 of relay 10A(2) to battery through the reorder relay ROR1(2). Relay ROR1(2) operates and locks over its contact 3 to off-normal ground. At its contact 4, relay ROR1(2) opens the circuit of relay MS2(2), which releases, in turn releasing relay MRL(2). Relay ROR1(2) at its contact 1 opens the circuit of slow-to-release relay RO(2). When relay RO(2) releases, it connects ground over its back contact to the winding of relay MS2(2) causing that relay to reoperate. Relay MS2(2) closes the previously traced circuit for operating the marker connector 252 to connect the sender with an idle marker. Relay ROR1(2) at its contact 2 connects ground to conductor 261 to tell the marker that a connection is to be set up to a reorder trunk.

The marker, in response to the reorder signal on conductor 261, connects ground to conductor 262, operating relay MT(2) which opens the connections with the outgoing trunk. The disconnection of ground from conductor 218 permits the trunk link switches 154 and 254 to release and the trunk circuits of Figs. 3 and 4 to restore to normal.

The marker proceeds to set up a connection to a reorder trunk to which a source of reorder signal is connected and the sender completes its functions as for a manual call in the manner described in the McKim-Strickler patent.

What is claimed is:

1. In a telephone system, incoming trunks, switches, outgoing trunks, originating senders, means responsive to a call on one of said incoming trunks to connect one of said originating senders with said one incoming trunk means to register a designation in said originating sender, switch controlling means responsive to said registration to operate said switches to connect said one incoming trunk and said originating sender with one of said outgoing trunks, incoming senders, means responsive to the connection of said one incoming trunk with said one outgoing trunk to connect one of said incoming senders with said one outgoing trunk, means operated when all of said incoming senders are busy to transmit a multifrequency code signal over said one outgoing trunk to said originating sender and means in said originating sender responsive to said signal to cause the transmission of a reorder signal over said one incoming trunk.

2. In a telephone system, incoming trunks, switches, outgoing trunks, originating senders, means responsive to a call on one of said incoming trunks to connect one of said originating senders with said one incoming trunk, means to register a designation in said originating sender, switch controlling means responsive to said registration to operate said switches to connect said one incoming trunk and said originating sender with one of said outgoing trunks, incoming senders, an incoming sender connector, means in said one outgoing trunk operated responsive to the connection of said one incoming trunk with said one outgoing trunk, means under the control of said connection responsive means to operate said incoming sender connector to connect one of said incoming senders with said one outgoing trunk, an all senders busy relay in said incoming sender connector operated when all of said incoming senders are busy, means under the control of said all senders busy relay to connect a multifrequency code signal to all of said outgoing trunks, means under the control of said connection responsive means to transmit said signal over said one outgoing trunk to said originating sender and means in said originating sender responsive to said signal to cause the transmission of a reorder signal over said one incoming trunk.

3. In a telephone system, incoming trunks, switches, outgoing trunks, originating senders, means responsive to a call on one of said incoming trunks to connect one of said originating senders with said one incoming trunk, a multifrequency code receiving circuit in said originating sender, means under the control of said multifrequency code receiving circuit to register a designation in said originating sender, switch controlling means responsive to said registration to operate said switches to connect said one incoming trunk and said originating sender with one of said outgoing trunks, registration completed indicating means in said originating sender, connection established indicating means in said one outgoing trunk, incoming senders, an incoming sender connector, means under the control of the connection established indicating means of said one outgoing trunk to operate said sender connector to connect an idle one of said incoming senders with said one outgoing trunk, an all senders busy relay in said sender connector, means to operate said all senders busy relay when all of said incoming senders are busy, means under the control of said all senders busy relay to connect a multifrequency code signal to all of said outgoing trunks, means under the control of the connection indicating means of said one outgoing trunk to transmit said signal over said one outgoing trunk to said originating sender, means under the control of the registration completed indicating means of said originating sender to extend said signal to said receiving circuit and means under the control of said receiving circuit to cause the transmission of a reorder signal over said one incoming trunk.

4. In a telephone system, incoming trunks, switches, outgoing trunks, originating senders, means responsive to a call on one of said incoming trunks to connect one of said originating senders with said one incoming trunk, a multifrequency code receiving circuit in said originating sender, means under the control of said code receiving circuit to register a designation in said originating sender, switch controlling means responsive to said registration to operate said switches to connect said one incoming trunk and said originating sender with one of said outgoing trunks, registration completed indicating means in said originating sender, connection established indicating means in said one outgoing trunk, incoming senders, an incoming sender connector, means under the control of the connection established indicating means of said one outgoing trunk to operate said sender connector to connect an idle one of said incoming senders with said one outgoing trunk, an all senders busy relay in said sender connector, means to operate said all senders busy relay when all of said incoming senders are busy, means under the control of said all senders busy relay to connect a multifrequency code signal to all of said outgoing trunks, means under the control of the connection indicating means of said one outgoing trunk to transmit said signal over said one outgoing trunk to said originating sender, means under the control of the registration completed indicating means of said sender to extend said signal to said code receiving circuit, a reorder signal source, a reorder trunk circuit connected with said source, and means under the control of said code receiving circuit to release said one outgoing trunk and to connect said one incoming trunk with said reorder trunk to cause the transmission of a reorder signal over said one incoming trunk.

MARTIN E. MALONEY.

References Cited in the file of this patent

UNITED STATES PATENTS

| Number | Name | Date |
|---|---|---|
| 2,235,803 | Carpenter | Mar. 18, 1941 |
| 2,293,620 | Osten-Sacken | Aug. 18, 1942 |
| 2,385,228 | Ostline | Sept. 18, 1945 |